US012600665B2

(12) United States Patent
Korwin-Edson

(10) Patent No.: US 12,600,665 B2
(45) Date of Patent: Apr. 14, 2026

(54) FIBERGLASS COMPOSITION FOR HIGHER MODULUS

(71) Applicant: Owens Corning Intellectual Capital, LLC, Toledo, OH (US)

(72) Inventor: Michelle Korwin-Edson, Granville, OH (US)

(73) Assignee: OWENS CORNING INTELLECTUAL CAPITAL, LLC, Toledo, OH (US)

( * ) Notice: Subject to any disclaimer, the term of this patent is extended or adjusted under 35 U.S.C. 154(b) by 865 days.

(21) Appl. No.: 17/786,641

(22) PCT Filed: Dec. 30, 2020

(86) PCT No.: PCT/US2020/067420
§ 371 (c)(1),
(2) Date: Jun. 17, 2022

(87) PCT Pub. No.: WO2021/138394
PCT Pub. Date: Jul. 8, 2021

(65) Prior Publication Data
US 2023/0035048 A1 Feb. 2, 2023

Related U.S. Application Data

(60) Provisional application No. 62/956,422, filed on Jan. 2, 2020.

(51) Int. Cl.
| | |
|---|---|
| *C03C 3/087* | (2006.01) |
| *C03B 37/02* | (2006.01) |
| *C03C 13/00* | (2006.01) |
| *C08J 5/04* | (2006.01) |
| *F03D 1/06* | (2006.01) |

(52) U.S. Cl.
CPC .............. *C03C 13/00* (2013.01); *C03B 37/02* (2013.01); *C03C 3/087* (2013.01); *C08J 5/043* (2013.01); *F03D 1/0675* (2013.01); *F05D 2300/603* (2013.01)

(58) Field of Classification Search
CPC ................................ C03C 3/087; C03C 13/00
See application file for complete search history.

(56) References Cited

U.S. PATENT DOCUMENTS

| | | | |
|---|---|---|---|
| 5,789,329 | A | 8/1998 | Eastes et al. |
| 8,476,175 | B2 | 7/2013 | Lecomte |
| 8,841,222 | B2 | 9/2014 | Nonaka et al. |
| 9,416,235 | B2 | 8/2016 | Nonaka et al. |
| 10,029,443 | B2 | 7/2018 | Sakuma et al. |
| 10,377,662 | B2 | 8/2019 | Zhang et al. |
| 11,040,908 | B2 | 6/2021 | Nonaka et al. |
| 11,312,654 | B2 | 4/2022 | Yokota et al. |
| 11,339,085 | B2 | 5/2022 | Cao et al. |
| 2007/0087139 | A1 | 4/2007 | Creux et al. |

| | | | |
|---|---|---|---|
| 2012/0163987 | A1 | 6/2012 | Hausrath et al. |
| 2018/0179104 | A1* | 6/2018 | Zhang .................... C03C 13/00 |
| 2019/0194064 | A1* | 6/2019 | McGinnis ............... C08J 5/043 |
| 2022/0234945 | A1 | 7/2022 | Cao et al. |

FOREIGN PATENT DOCUMENTS

| | | |
|---|---|---|
| CN | 101691278 A | 4/2010 |
| CN | 102276153 B | 11/2013 |
| CN | 104291685 A | 1/2015 |
| CN | 107216042 A | 9/2017 |
| CN | 108395109 A | 8/2018 |
| CN | 109052971 A | 12/2018 |
| WO | 2010075267 A1 | 7/2010 |
| WO | 2011095597 A1 | 8/2011 |
| WO | 2011131761 A1 | 10/2011 |
| WO | 2012087313 A1 | 6/2012 |
| WO | 2013156477 A1 | 10/2013 |
| WO | 2015009686 A1 | 1/2015 |
| WO | 2019126252 A1 | 6/2019 |
| WO | 2020041581 A1 | 2/2020 |
| WO | 2020112396 A2 | 6/2020 |

OTHER PUBLICATIONS

Office Action from Canadian Application No. 3,166,215 dated Jun. 15, 2023.
Office Action from Canadian Application No. 3,166,215 dated Jun. 14, 2024.
Office Action from Chinese Application No. 202010091849.X dated Jun. 26, 2024.
"Glass Fiber and Mineral Wool Encyclopedia," Editor-in-chief: Yaoming Zhang, Chemical Industry Press, First Edition, p. 48, Mar. 2001.
Office Action from Egyptian Application No. PCT 906/2022 received Nov. 14, 2024.
Office Action from Chinese Application No. 202010091849.X dated Sep. 29, 2023.
Office Action from Eurasian Application No. 202291871 dated Jun. 26, 2023.
Office Action from Egyptian Application No. PCT 906/2022 dated Dec. 26, 2023.
Office Action from Eurasian Application No. 202291871 dated Feb. 5, 2024.

(Continued)

*Primary Examiner* — Elizabeth A. Bolden

(74) *Attorney, Agent, or Firm* — Bryan D. Zerhusen, Esq.; Nicholas R. Herrel, Esq.; CANTOR COLBURN, LLP

(57) ABSTRACT

A glass composition is provided that includes about 57.0 to 62.0% by weight $SiO_2$, about 20.0 to 25.0% by weight $Al_2O_3$, about 8.0 to 12.5% by weight MgO, about 7 to 9.0% by weight CaO, about 0.4 to 1.0% by weight $Li_2O$, 0.0 to about 1.0% by weight $Na_2O$, about 0 to 0.5% by weight $K_2O$; and 0.2 to about 1.5% by weight $TiO_2$. The glass composition has a fiberizing temperature of no greater than about 1,300 C. Such applications include woven fabrics for use in forming wind blades and aerospace structures.

27 Claims, No Drawings

(56)                 References Cited

OTHER PUBLICATIONS

Office Action from Korean Application No. 10-2022-7026361 dated Oct. 17, 2024.

Office Action from UAE Application No. P6001275/2022 dated Sep. 2, 2024.

Office Action from Japanese Application No. 2022-540735 dated Dec. 12, 2024.

International Search Report and Written Opinion from PCT/US2020/067420 dated Mar. 31, 2021.

Office Action from European Application No. 20845844.8 dated Mar. 18, 2024.

Office Action from Saudi Arabian Application No. 522433198 dated Apr. 19, 2023.

Extended European Search Report from European Application No. 25157514.8 dated Jun. 16, 2025.

Office Action from Japanese Application No. 2022-540735 dated Apr. 17, 2025.

* cited by examiner

FIBERGLASS COMPOSITION FOR HIGHER MODULUS

CROSS REFERENCE TO RELATED APPLICATIONS

This application is the U.S. national stage entry of PCT/US2020/067420, filed Dec. 30, 2020, which claims priority to and all benefit of U.S. Provisional Patent Application No. 62/956,422, filed on Jan. 2, 2020, the entire disclosures of which are fully incorporated herein by reference.

BACKGROUND OF THE INVENTION

Glass fibers are manufactured from various raw materials combined in specific proportions to yield a desired composition, commonly termed a "glass batch." This glass batch may be melted in a melting apparatus and the molten glass is drawn into filaments through a bushing or orifice plate (the resultant filaments are also referred to as continuous glass fibers). A sizing composition containing lubricants, coupling agents and film-forming binder resins may then be applied to the filaments. After the sizing is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers.

The composition of the glass batch, along with the fiberglass manufactured therefrom, is often expressed in terms of the oxides contained therein, which commonly include $SiO_2$, $Al_2O_3$, CaO, MgO, $B_2O_3$, $Na_2O$, $K_2O$, $Fe_2O_3$, $TiO_2$, $Li_2O$, and the like. Numerous types of glasses may be produced from varying the amounts of these oxides, or eliminating some of the oxides in the glass batch. Examples of such glasses that may be produced include R-glass, E-glass, S-glass, A-glass, C-glass, and ECR-glass. The glass composition controls the forming and product properties of the glass. Other characteristics of glass compositions include the raw material cost and environmental impact.

For instance, E-glass is an aluminoborosilicate glass, generally alkali-free, and commonly used in electrical applications. One advantage of E-Glass is that its liquidus temperature allows operating temperatures for producing glass fibers to be approximately 1900° F. to 2400° F. (1038° C. to 1316° C.). The ASTM classification for E-glass fiber yarns used in printed circuit boards and aerospace applications defines the composition to be 52 to 56 weight % $SiO_2$, 16 to 25 weight % CaO, 12 to 16 weight % $Al_2O_3$, 5 to 10 weight % $B_2O_3$, 0 to 5 weight % MgO, 0 to 2 weight % $Na_2O$ and $K_2O$, 0 to 0.8 weight % $TiO_2$, 0.05 to 0.4 weight % $Fe_2O_3$ and 0 to 1.0 weight % Fluorine.

Boron-free fibers are sold under the trademark ADVANTEX® (Owens Corning, Toledo, Ohio, USA). Boron-Free fibers, such as are disclosed in U.S. Pat. No. 5,789,329, incorporated herein by reference in its entirety, offer a significant improvement in operating temperatures over boron-containing E-glass. Boron-Free glass fibers fall under the ASTM definition for E-glass fibers for use in general-use applications.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains about 58 to about 60% by weight $SiO_2$, about 23.5 to about 25.5% by weight $Al_2O_3$, about 14 to about 17% by weight CaO plus MgO, and less than about 2% by weight of miscellaneous components. R-Glass contains more alumina and silica than E-Glass and requires higher melting and processing temperatures during fiber forming. Typically, the melting and processing temperatures for R-Glass are higher than those for E-Glass. This increase in processing temperature requires the use of a high-cost platinum-lined melter. In addition, the close proximity of the liquidus temperature to the forming temperature in R-Glass requires that the glass be fiberized at a viscosity lower than E-Glass, which is customarily fiberized at or near about 1000 poise. Fiberizing R-Glass at the customary 1000 poise viscosity would likely result in glass devitrification, which causes process interruptions and reduced productivity.

High performance glass fibers possess higher strength and stiffness, compared to traditional E-glass fibers. In particular, for some products, stiffness is crucial for modeling and performance. For example, composites, such as wind turbine blades, prepared from glass fibers with good stiffness properties would allow for longer wind blades on electrical generating wind stations while keeping flexure of the blade within acceptable limits. Elastic modulus (interchangeable with "Young's modulus") is a measure of the fiber stiffness, defining a relationship between the stress applied to a material and the strain produced by the same material. A stiff material has a high elastic modulus and changes its shape only slightly under elastic loads. A flexible material has a low elastic modulus and changes its shape considerably.

Although various types of high-performance glass compositions have been developed, such glass compositions often try to maximize elastic modulus and tensile strength. However, as the elastic modulus of glass fibers increases past a certain degree (i.e., above 92 GPa), composite wind blade molds can be lengthened, which requires fabricating new molds. It would be beneficial and cost effective to achieve a moderate elastic modulus that is compatible with current composite molds, while maintaining a low fiberizing temperature A fiberizing temperature of less than about 1,300° C. allows for most of the current state of the art materials and technology to be used to manufacture the glass fiber, thus enabling compatibility with already established manufacturing assets. Furthermore, a fiberizing temperature similar to other glass compositions already being made allows for fast campaigns to be run where a furnace switches from making one glass to another without having to change the forming technology. Lower fiberizing temperatures are better from an energy usage standpoint and also from a platinum volatilization standpoint. At higher temperatures, platinum volatilizes more rapidly and the lifetime of the forming technology is decreased.

Wind turbine blade manufacturers make a substantial investment in creating the molds that are used to form wind blades. Additionally, wind blades are becoming so large that entire plants are built around manufacturing a particular size blade. While the goal is generally to keep increasing the modulus of the glass fiber to enable the manufacture of longer blades, it is also desirable to make the best possible use of the molds and facilities that already exist. To do this the glass fiber must offer properties within a window of performances. If the glass performs too well in modulus, then it ethically requires new molds to be made to make use of the higher performance. These fibers allow more tolerance for manufacturing defects in these same molds as well. Accordingly, there is a desire to optimize performance without causing a necessary increase in wind blade size.

There is a need in the art for high-performance glass compositions with acceptable forming properties, such as having a sufficiently low fiberizing temperature, while providing a moderate, but not too high elastic modulus, such as between 90 and 92 GPa.

SUMMARY OF THE INVENTION

Various exemplary embodiments of the present inventive concepts are directed to a glass composition comprising $SiO_2$ in an amount from 57.0 to 62.0% by weight; $Al_2O_3$ in an amount from 20.0 to 25.0% by weight; CaO in an amount from 7.0 to 9.0% by weight; MgO in an amount from 8.0 to 12.5% by weight; $Na_2O$ in an amount from 0 to 1.0% by weight; $K_2O$ in an amount from 0 to 0.5% by weight; $Li_2O$ in an amount from 0.4 to 1.0% by weight; and $TiO_2$ in an amount from 0.2 to 1.5% by weight, expressed as percentages by weight based on the weight of the entire composition. The weight percent (R1) $(MgO+Al_2O_3)/(SiO_2+CaO)$ is at least 0.47 and a weight percent ratio (R3)$(MgO/SiO_2)$ is at least 0.19. The glass composition has a fiberizing temperature no greater than 1,300° C.

In any of the various embodiments, the combined amounts of $SiO_2$, $Al_2O_3$, MgO, and CaO may be at least 98% by weight and less than 99.5% by weight.

In any of the various embodiments, the composition comprises 57.1% by weight to less than 59% by weight $SiO_2$.

In any of the various embodiments, the composition comprises 7.9% by weight to less than 9.0% by weight CaO.

In any of the various embodiments, the composition comprises greater than 20% to 21% by weight $Al_2O_3$.

In any of the various embodiments, the composition includes 0.45% to 0.8 wt. % $Li_2O$.

In any of the various embodiments, the glass composition is free of rare earth oxides.

In any of the various embodiments, the composition is essentially free of $B_2O_3$.

In any of the various embodiments, the composition includes 0.1 to 0.8% by weight $Na_2O$.

In any of the various embodiments, the composition includes a weight percent ratio (R2) $(MgO+Al_2O_3+Li_2O)/$ $(CaO+SiO_2+Na_2O+K_2O)$ that is greater than 0.46.

Further exemplary aspects of the present inventive concepts are directed to a glass composition comprising $SiO_2$ in an amount from 58.0 to 6.20% by weight; $Al_2O_3$ in an amount from 20.0 to 25.0% by weight; CaO in an amount from 7.9 to 12.0% by weight; MgO in an amount from 8.0 to 12.5% by weight; $Na_2O$ in an amount from 0 to 1.0% by weight; $K_2O$ in an amount from 0 to 0.5% by weight; $Li_2O$ in an amount from 0.4 to 1.0% by weight; and $TiO_2$ in an amount from 0.2 to 1.5% by weight. In various exemplary embodiments, the composition includes a weight percent ratio (R2) $(MgO+Al_2O_3+Li_2O)/(CaO+SiO_2+Na_2O+K_2O)$ that is greater than 0.46 and a weight percent ratio (R3) $(MgO/SiO_2)$ is at least 0.19. In some embodiments, the glass composition has a fiberizing temperature no greater than 1,300° C.

In any of the various embodiments, the combined amounts of $SiO_2$, $Al_2O_3$, MgO, and CaO may be at least 98% by weight and less than 99.5% by weight.

In any of the various embodiments, the composition comprises 57.1% by weight to less than 59% by weight $SiO_2$.

In any of the various embodiments, the composition comprises 7.9% by weight to less than 9.0% by weight CaO.

In any of the various embodiments, the composition comprises greater than 20% to 21% by weight $Al_2O_3$.

In any of the various embodiments, the composition includes 0.45% to 0.8 wt. % $Li_2O$.

In any of the various embodiments, the glass composition is free of rare earth oxides.

In any of the various embodiments, the composition is essentially free of $B_2O_3$.

In any of the various embodiments, the composition includes 0.1 to 0.8% by weight $Na_2O$.

In any of the various embodiments, the composition includes a weight percent ratio (R1) $(MgO+Al_2O_3)/(SiO_2+$ $CaO)$ is at least 0.47.

Yet further exemplary aspects of the present inventive concepts are directed to a glass fiber formed from a glass composition comprising $SiO_2$ in an amount from 57.0 to 62.0% by weight; $Al_2O_3$ in an amount from 20.0 to 25.0% by weight; CaO in an amount from 7 to 9.0% by weight; MgO in an amount from 8.0 to 12.5% by weight; $Na_2O$ in an amount from 0 to 1.0% by weight; $K_2O$ in an amount from 0 to 0.5% by weight; $Li_2O$ in an amount from 0.4 to 1.0% by weight; and $TiO_2$ in an amount from 0.2 to 1.5% by weight. The glass composition has a weight percent ratio (R1) $(MgO+Al_2O_3)/(SiO_2+CaO)$ is at least 0.47 and a weight percent ratio (R3) $(MgO/SiO_2)$ is at least 0.19. The glass composition has a fiberizing temperature no greater than 1,300° C. and the glass fiber has an elastic modulus of between 90 GPa and 92 GPa.

In any of the various embodiments, the glass fibers have a density that is at least 2.6 $g/cm^3$.

Yet further exemplary aspects of the inventive concepts are directed to a method of forming a continuous glass fiber that includes providing a molten composition according to any of the exemplary embodiments disclosed herein and drawing the molten composition through an orifice to form a continuous glass fiber.

Further exemplary aspects of the inventive concepts are directed to a reinforced composite product comprising a polymer matrix and a plurality of glass fibers formed from a glass composition comprising: $SiO_2$ in an amount from 57.0 to 62.0% by weight; $Al_2O_3$ in an amount from 20.0 to 25.0% by weight; CaO in an amount from 7 to 9.0% by weight; MgO in an amount from 8.0 to 12.5% by weight; $Na_2O$ in an amount from 0 to 1.0% by weight; $K_2O$ in an amount from 0 to 0.5% by weight; $Li_2O$ in an amount from 0.4 to 1.0% by weight; and $TiO_2$ in an amount from 0.2 to 1.5% by weight. In some exemplary embodiments, the glass composition has a weight percent ratio (R1) $(MgO+Al_2O_3)/$ $(SiO_2+CaO)$ is at least 0.47 and a weight percent ratio (R3) $(MgO/SiO_2)$ is at least 0.19. The glass composition has a fiberizing temperature no greater than 1,300° C. and the glass fiber has an elastic modulus of between 90 GPa and 92 GPa.

The foregoing and other objects, features, and advantages of the invention will appear more fully hereinafter from a consideration of the detailed description that follows.

DETAILED DESCRIPTION

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

By "substantially free" it is meant that a composition includes less than 1.0 wt. % of the recited component, including no greater than 0.8 wt. %, no greater than 0.6 wt. %, no greater than 0.4 wt. %, no greater than 0.2 wt. %, no greater than 0.1 wt. %, and no greater than 0.05 wt. %. In any of the exemplary embodiments, "substantially free" means that a composition includes no greater than 0.01 wt. % of the recited component.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least each numerical parameter should be construed in light of the number of significant digits and ordinary rounding approaches.

Unless otherwise indicated, any element, property, feature, or combination of elements, properties, and features, may be used in any embodiment disclosed herein, regardless of whether the element, property, feature, or combination of elements, properties, and features was explicitly disclosed in the embodiment. It will be readily understood that features described in relation to any particular aspect described herein may be applicable to other aspects described herein provided the features are compatible with that aspect. In particular: features described herein in relation to the method may be applicable to the glass fiber product and vice versa; features described herein in relation to the method may be applicable to the glass composition and vice versa; and features described herein in relation to the glass fiber may be applicable to the glass composition and vice versa.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein. Moreover, any numerical value reported in the Examples may be used to define either an upper or lower end-point of a broader compositional range disclosed herein.

The present disclosure relates to a glass composition with a moderately high elastic modulus and low fiberizing temperature, while having a lower cost than conventional high modulus glass compositions.

The glass compositions disclosed herein are suitable for melting in traditional commercially available refractory-lined glass furnaces, which are widely used in the manufacture of glass reinforcement fibers.

The glass composition may be in molten form, obtainable by melting the components of the glass composition in a melter. The glass composition exhibits a low fiberizing temperature, which is defined as the temperature that corresponds to a melt viscosity of about 1000 Poise, as determined by ASTM C965-96(2007). Lowering the fiberizing temperature may reduce the production cost of the glass fibers because it allows for a longer bushing life and reduced energy usage necessary for melting the components of a glass composition. Therefore, the energy expelled is generally less than the energy necessary to melt many commercially available glass formulations. Such lower energy requirements may also lower the overall manufacturing costs associated with the glass composition.

For example, at a lower fiberizing temperature, a bushing may operate at a cooler temperature and therefore does not "sag" as quickly as is typically seen. "Sag" is a phenomenon that occurs when a bushing that is held at an elevated temperature for extended periods of time loses its determined stability. Thus, by lowering the fiberizing temperature, the sag rate of the bushing may be reduced and the bushing life can be maximized. Additionally, lower fiberizing temperatures are better from an energy usage standpoint and also slows the volatilization of platinum.

In any of the exemplary embodiments, the glass composition may have a fiberizing temperature of less than 2,372° F. (1,300° C.), including fiberizing temperatures of no greater than 2,363° F. (1,295° C.), no greater than 2,354° F. (1,290° C.), no greater than 2,345° F. (1,285° C.), and no greater than 2,336° F. (1,280° C.). In any of the exemplary embodiments, the glass composition may have a fiberizing temperature between 2,330° F. (1,276.76° C.) and 2,366.6° F. (1,297° C.), or between 2,345° F. (1,285° C.) and 2,357.6° F. (1,292° C.).

Another fiberizing property of a glass composition is the liquidus temperature. The liquidus temperature is defined as the highest temperature at which equilibrium exists between liquid glass and its primary crystalline phase. The liquidus temperature, in some instances, may be measured by exposing the glass composition to a temperature gradient in a platinum-alloy boat for 16 hours (ASTM C829-81(2005)). At all temperatures above the liquidus temperature, the glass is completely molten, i.e., it is free from crystals. At temperatures below the liquidus temperature, crystals may form.

In any of the exemplary embodiments, the glass composition may have a liquidus temperature below 2,350° F., including liquidus temperature of no greater than 2,300° F. (1,221.11° C.), no greater than 2,250° F. (1,232.22° C.), no greater than 2,232° F. (1,222.22° C.), no greater than 2,225° F. (1,218.33° C.), and no greater than 2,220° F. (1,215.56° C.). In any of the exemplary embodiments, the glass composition may have a liquidus temperature between 2,200° F. (1,204.44° C.) and 2,300° F. (1,221.11° C.), or between 2,210° F. (1,210° C.) and 2,235° F. (1,223.89° C.).

A third fiberizing property is "ΔT" said as delta T, which is defined as the difference between the fiberizing temperature and the liquidus temperature. If the ΔT is too small, the molten glass may crystallize within the fiberizing apparatus and cause a break in the manufacturing process. Desirably, the ΔT is as large as possible for a given forming viscosity because it offers a greater degree of flexibility during fiberizing and helps to avoid devitrification both in the glass distribution system and in the fiberizing apparatus. A large ΔT additionally reduces the production cost of the glass fibers by allowing for a greater bushing life and a less sensitive forming process.

In any of the exemplary embodiments, the glass composition may have a ΔT of at least 40° C., including at least 55° C., at least 60° C., at least 70° C., at least 75° C., at least 80° C., and at least 90° C. In various exemplary embodiments, the glass composition has a $\Delta T$ between 40° C. and 90° C., including between 50° C. and 85° C., and between 70° C. and 80° C.

The glass composition may include about 56.0 to about 62.0% by weight $SiO_2$, about 17.0 to about 24.0% by weight $Al_2O_3$, about 9.0 to about 13.0% by weight MgO, about 7.0 to about 11.0% by weight CaO, about 0.0 to about 1.0% by weight $Na_2O$, 0 to about 2.0% by weight $TiO_2$, 0 to about 1.5% by weight $Fe_2O_3$, and about 0.2% to about 1.0 by weight $Li_2O$.

Advantageously, the ratio (R1) of the weight percent of combined alumina oxide and magnesium oxide to the weight percent of combined silica dioxide and calcium oxide $(MgO+Al_2O_3)/(SiO_2+CaO)$ is at least 0.47, such as at least 0.48, and at least 0.49. An R1 ratio of at least 0.47 ensures that the resulting fiberglass demonstrates a sufficiently high elastic modulus.

In some exemplary embodiments, the ratio (R2) of the weight percent of combined MgO, $Al_2O_3$, and $Li_2O$ to the weight percent of combined CaO, $SiO_2$, $Na_2O$, and $K_2O$ $(MgO+Al_2O_3+Li_2O)/(CaO+SiO_2+Na_2O+K_2O)$ is greater than 0.46, including at least 0.47, at least 0.48, at least 0.49, and at least 0.50.

In any of the exemplary embodiments, the ratio (R3) of the weight percent of MgO to the weight percent of $SiO_2$ is above 0.175, such as above 0.18, above 0.19, or above 0.20.

The glass composition of the subject invention may include any combination of R1, R2, and R3, although a glass composition that satisfies each of the provided ratios has a sufficiently high modulus, specific modulus, and $\Delta T$ without increasing the fiberizing temperature above 1,300° C. These ratios also provide a noticeable increase in pristine tensile strength.

The glass composition includes at least 57% by weight, but no greater than 62% by weight $SiO_2$. In some exemplary embodiments, the glass composition includes at least or greater than 57.1% by weight $SiO_2$, including at least or greater than 57.25% by weight, at least or greater than 57.3% by weight, at least or greater than 57.5% by weight, at least or greater than 57.7% by weight, and at least or greater than 58.0% by weight. In some exemplary embodiments, the glass composition includes no greater than 60.5% by weight $SiO_2$, including no greater than 60.3% by weight, no greater than 60.2% by weight, no greater than 60% by weight, no greater than 59.8% by weight, and no greater than 59.5% by weight. In some exemplary embodiments, the glass composition comprises 57.15% by weight to less than 59% by weight $SiO_2$.

To achieve both the desired mechanical and fiberizing properties, one important aspect of the glass composition is having an $Al_2O_3$ concentration of at least 19.0% by weight and no greater than 25.0% by weight. Including less than 19.0% by weight $Al_2O_3$ contributes to the formation of a glass fiber with an unfavorably low modulus. In some exemplary embodiments, the glass composition includes at least 19.5% by weight $Al_2O_3$, including at least 19.7% by weight, at least 20.0% by weight, at least 20.05% by weight, at least 20.1, and at least 20.3% by weight. In some exemplary embodiments, the glass composition includes no greater than 22.0% by weight $Al_2O_3$, including no greater than 21.8% by weight, no greater than 21.6% by weight, no greater than 21.2% by weight, no greater than 21.1% by weight, and no greater than 21.0% by weight. In any of the exemplary embodiments, the glass composition may comprise 20.0% by weight to less than 21.0% by weight $Al_2O_3$. Including higher levels of $Al_2O_3$ increases the crystallization tendency.

The glass composition advantageously includes at least 8.0% by weight and no greater than 15.0% by weight MgO. Including greater than 15.0% by weight MgO will cause the liquidus temperature to increase, which also increases the glass's crystallization tendency. Including less than 8.0% by weight forms a glass fiber with an unfavorably low modulus if substituted by CaO and an unfavorable increase in viscosity if substituted with $SiO_2$. In any of the exemplary embodiments, the glass composition may include at least 9.5% by weight MgO, including at least 10.0% by weight, at least 10.5% by weight, at least 11.0% by weight, at least 11.10% by weight, and at least 11.50% by weight MgO. In any of the exemplary embodiments, the glass composition may include no greater than 12.5% by weight MgO, such as no greater than 12.0% by weight, no greater than 11.9% by weight, or no greater than 11.8% by weight. In any of the exemplary embodiments the glass composition may comprise an MgO concentration between 10.5% by weight and less than 12.0% by weight.

The glass composition advantageously includes at least 7.0% by weight and no greater than 12.0% by weight CaO. Including greater than 12.0% by weight CaO forms a glass with a low elastic modulus. Including less than 7.0% by weight will either unfavorably increase the liquidus temperature or viscosity depending on with what oxide the CaO is substituted. In any of the exemplary embodiments, the glass composition may include at least 7.15% by weight CaO, including at least 7.4% by weight, at least 7.7%, at least 8.0%, and at least 8.2% by weight. In any of the exemplary embodiments, the glass composition may include no greater than 11.5% by weight CaO, such as no greater than 10.0% by weight, no greater than 9.8% by weight, no greater than 9.5% by weight, and no greater than 9.0% by weight. In any of the exemplary embodiments the glass composition may comprise a CaO concentration between 7.9% by weight and less than 9.0% by weight.

In any of the exemplary embodiments, the combined amounts of $SiO_2$, $Al_2O_3$, MgO, and CaO may be at least 98.0% by weight, or at least 99% by weight, and no greater than 99.5% by weight. In any of the exemplary embodiments, the combined amounts of $SiO_2$, $Al_2O_3$, MgO, and CaO may be between 97.5% by weight and less than 99.5% by weight, including between 98.0% by weight and less than 99.0% by weight, and between 98.05% by weight and 98.8% by weight.

The glass composition includes $Li_2O$ in an amount from about 0.1% by weight up to about 2.0% by weight. The presence of $Li_2O$ decreases the fiberizing temperature of the glass composition and increases the elastic modulus of the glass fibers formed therefrom. In any of the exemplary embodiments, the glass composition may include about 0.2% by weight to about 1.0% by weight $Li_2O$, including about 0.4% by weight to about 0.8% by weight and about 0.45 to about 0.7% by weight. In any of the exemplary embodiments, the glass composition may include greater than 0.45% by weight and less than 0.8% by weight $Li_2O$.

The glass composition may include up to about 2.0% by weight $TiO_2$. In any of the exemplary embodiments, the glass composition may include about 0.05% by weight to about 1.5% by weight $TiO_2$, including about 0.4% by weight to about 1.0% by weight and about 0.5 to about 0.7% by weight.

The glass composition may include up to about 2.0% by weight $Fe_2O_3$. In any of the exemplary embodiments, the glass composition may include about 0.05% by weight to about 1.0% by weight $Fe_2O_3$, including about 0.2% by weight to about 0.8% by weight and about 0.3 to about 0.6% by weight.

In any of the exemplary embodiments, the glass composition may include less than 2.0% by weight of the alkali metal oxides $Na_2O$ and $K_2O$, including between 0 and 1.5% by weight. The glass composition may advantageously include both $Na_2O$ and $K_2O$ in an amount greater than 0.01% by weight of each oxide. In any of the exemplary embodiments, the glass composition may include about 0 to about 1.0% by weight $Na_2O$, including about 0.01 to about 0.5% by weight, about 0.03 to about 0.3% by weight, and 0.04 to about 0.1% by weight. In any of the exemplary embodiments, the glass composition may include about 0 to about 1% by weight $K_2O$, including about 0.01 to about 0.5% by weight, about 0.03 to about 0.3% by weight, and 0.04 to about 0.2% by weight.

As used herein, the terms "weight percent," "% by weight," ".%," and "percent by weight" may be used interchangeably and are meant to denote the weight percent (or percent by weight) based on the total composition.

The inventive glass compositions may be free or substantially free of $B_2O_3$, SrO, and fluorine, although any may be added in small amounts to adjust the fiberizing and finished glass properties and will not adversely impact the properties if maintained below several percent. As used herein, substantially free of $B_2O_3$, SrO, and fluorine means that the sum of the amounts of $B_2O_3$, SrO, and fluorine present is less than 1.0% by weight of the composition. The sum of the amounts of $B_2O_3$, SrO, and fluorine present may be less than about 0.5% by weight of the composition, including less than about 0.2% by weight, less than about 0.1% by weight, and less than about 0.05% by weight.

The glass compositions may further include impurities and/or trace materials without adversely affecting the glasses or the fibers. These impurities may enter the glass as raw material impurities or may be products formed by the chemical reaction of the molten glass with furnace components. Non-limiting examples of trace materials include zinc, strontium, barium, and combinations thereof. The trace materials may be present in their oxide forms and may further include fluorine and/or chlorine. In any of the exemplary embodiments, the inventive glass compositions may contain less than 1.0% by weight, including less than 0.5% by weight, less than 0.2% by weight, and less than 0.1% by weight of each of BaO, SrO, ZnO, $ZrO_2$, $P_2O_5$, and $SO_3$. Particularly, the glass composition may include less than about 5.0% by weight of BaO, SrO, ZnO, $ZrO_2$, $P_2O_5$, and/or $SO_3$ combined, wherein each of BaO, SrO, ZnO, $ZrO_2$, $P_2O_5$, and $SO_3$ if present at all, is present in an amount of less than 1.0% by weight.

In any of the exemplary embodiments, the glass compositions may include less than 2.0 wt. % of the following modifying components (collectively): $CeO_2$, $Li_2O$, $Fe_2O_3$, $TiO_2$, $WO_3$, and $Bi_2O_3$. In any of the exemplary embodiments, the glass compositions may include less than 1.5 wt. % of the modifying components.

In any of the exemplary embodiments, the glass composition may include less than 1.0% by weight of the rare earth oxides $Y_2O_3$, $Ga_2O_3$, $Sm_2O_3$, $Nd_2O_3$, $La_2O_3$, $Ce_2O_3$, and $Sc_2O_3$ ("$R_2O_3$") and $Ta_2O_5$, $Nb_2O_5$, or $V_2O_5$ ("$R_2O_5$"), including between 0 and 0.9% by weight, or between 0 and 0.5% by weight. In some exemplary embodiments, the glass composition is free of rare earth oxides.

As indicated above, the inventive glass compositions unexpectedly demonstrate a balance between a low fiberizing temperature and a moderate elastic (Young's) modulus and tensile strength, to provide high-performance glass fibers for use in current composite mold specifications, without requiring the reconfiguration of such downstream molds.

The fiber tensile strength is also referred herein simply as "strength." In any of the exemplary embodiments, the tensile strength is measured on pristine fibers (i.e., unsized and untouched laboratory produced fibers) using an Instron tensile testing apparatus according to ASTM D2343-09. Exemplary glass fibers formed form the above described inventive glass composition may have a fiber tensile strength of at least 4,500 MPa, including at least 4,600 MPa, at least 4,700 MPa, at least 4,800 MPa, at least 4,825 MPa, and at least 4,850 MPa. In any of the exemplary embodiments, the glass fibers formed from the herein described composition may have a fiber tensile strength of from about 4,000 to about 5,000 MPa, including about 4,350 MPa to about 4,950, about 4,400 to about 4,900 MPa. Advantageously, the combination of compositional parameters disclosed herein makes it possible to produce glass fibers having tensile strengths of at least 4,800 MPa, including at least 4,850 MPa, while maintaining desirable fiberizing properties and a moderate elastic modulus.

The elastic modulus of a glass fiber may be determined by taking the average measurements on five single glass fibers measured in accordance with the sonic measurement procedure outlined in the report "Glass Fiber and Measuring Facilities at the U.S. Naval Ordnance Laboratory", Report Number NOLTR 65-87, Jun. 23, 1965.

The exemplary glass fibers formed from the inventive glass composition may have a moderately high elastic (Young's) modulus of between about 90 GPa and about 92 GPa. It is important to maintain a moderate elastic modulus and not exceed 92 GPa, to ensure that the glass fibers can be used in existing composite molds, which adds to the cost savings of the present glass composition. At an elastic modulus above 92 GPa, new composite molds would be desirable to increase the size, etc., of the composite. However, a target elastic modulus between 90 and 92 GPa provides improved composite performance within current mold specifications. In any of the exemplary embodiments, the glass fibers formed in accordance with the present application may have an elastic modulus of at least 90.5 GPa, such as at least 90.6 GPa, at least 90.8 GPa, at least 91.0 GPa, at least 91.2 GPa. In any of the exemplary embodiments, the exemplary glass fibers formed from the inventive glass composition may have an elastic modulus of between about 90.2 GPa and about 92 GPa, including between about 90.5 GPa and about 91.9 GPa, and between about 90.7 GPa and about 91.8 GPa.

The elastic modulus may then be used to determine the specific modulus. It is desirable to have a specific modulus as high as possible to achieve a lightweight composite material that adds stiffness to the final article. Specific modulus is important in applications where stiffness of the product is an important parameter, such as in wind energy and aerospace applications. As used herein, the specific modulus is calculated by the following equation:

$$\text{Specific Modulus (MJ/kg)} = \text{Elastic Modulus (GPa)} / \text{Density (kg/cubic meter)}$$

The exemplary glass fibers formed from the inventive glass composition may have a specific modulus from about 32.0 MJ/kg to about 37.0 MJ/kg, including about 33 MJ/kg to about 36 MJ/kg, and about 34.0 MJ/kg to about 35.0 MJ/kg.

The density may be measured by any method known and commonly accepted in the art, such as the Archimedes method (ASTM C693-93(2008)) on unannealed bulk glass. The glass fibers have a density of from about 2.0 to about 3.0 g/cm$^3$. Particularly, in any of the exemplary embodiments, the glass fibers may have a density of from about 2.45 to about 2.8 g/cm$^3$, including from about 2.40 to about 2.75 g/cm$^3$, about 2.50 to about 2.70 g/cm$^3$, and about 2.60 to about 2.68 g/cm$^3$.

In any of the exemplary embodiments, the glass fibers formed from the inventive glass composition may have improved corrosion resistance.

According to some exemplary embodiments, a method is provided for preparing glass fibers from the glass composition described above. The glass fibers may be formed by any means known and traditionally used in the art. The glass fibers are formed by obtaining raw ingredients and mixing the ingredients in the appropriate quantities to give the desired weight percentages of the final composition. The method may further include providing the inventive glass composition in molten form and drawing the molten composition through orifices in a bushing to form a glass fiber.

The mixed batch may then be melted in a furnace or melter and the resulting molten glass is passed along a forehearth and drawn through the orifices of a bushing located at the bottom of the forehearth to form individual glass filaments. In some exemplary embodiments, the furnace or melter is a traditional refractory melter. By utilizing a refractory tank formed of refractory blocks, manufacturing costs associated with the production of glass fibers produced by the inventive composition may be reduced. In some exemplary embodiments, the bushing is a platinum alloy-based bushing. Strands of glass fibers may then be formed by gathering the individual filaments together. The fiber strands may be wound and further processed in a conventional manner suitable for the intended application.

The operating temperatures of the glass in the melter, forehearth, and bushing may be selected to appropriately adjust the viscosity of the glass, and may be maintained using suitable methods, such as control devices. The temperature at the front end of the melter may be automatically controlled to reduce or eliminate devitrification. The molten glass may then be pulled (drawn) through holes or orifices in the bottom or tip plate of the bushing to form glass fibers. In accordance with some exemplary embodiments, the streams of molten glass flowing through the bushing orifices are attenuated to filaments by winding a strand formed of a plurality of individual filaments on a forming tube mounted on a rotatable collet of a winding machine or chopped at an adaptive speed. The glass fibers of the invention are obtainable by any of the methods described herein, or any known method for forming glass fibers.

The fibers may be further processed in a conventional manner suitable for the intended application. For instance, in some exemplary embodiments, the glass fibers are sized with a sizing composition known to those of skill in the art. The sizing composition is in no way restricted, and may be any sizing composition suitable for application to glass fibers. The sized fibers may be used for reinforcing substrates such as a variety of plastics where the product's end use requires high strength and stiffness and low weight. Such applications include, but are not limited to, woven fabrics for use in forming wind blades; infrastructure, such as reinforcing concrete, bridges, etc.; and aerospace structures.

In this regard, any of the exemplary embodiments of the present invention may comprise a composite material incorporating the inventive glass fibers, as described above, in combination with a hardenable matrix material. This may also be referred to herein as a reinforced composite product. The matrix material may be any suitable thermoplastic or thermoset resin known to those of skill in the art, such as, but not limited to, thermoplastics such as polyesters, polypropylene, polyamide, polyethylene terephthalate, and polybutylene, and thermoset resins such as epoxy resins, unsaturated polyesters, phenolics, vinylesters, and elastomers. These resins may be used alone or in combination. The reinforced composite product may be used for the manufacture of composites, such as wind blades, rebar, pipe, filament winding, muffler filling, sound absorption, and the like.

In accordance with further exemplary embodiments, the invention provides a method of preparing a composite product as described above. The method may include combining at least one polymer matrix material with a plurality of glass fibers. Both the polymer matrix material and the glass fibers may be as described above.

EXAMPLES

Exemplary glass compositions according to the present invention were prepared by mixing batch components in proportioned amounts to achieve a final glass composition with the oxide weight percentages set forth in Tables 1-2, below.

The raw materials were melted in a platinum crucible in an electrically heated furnace at a temperature of 1,650° C. for 3 hours.

The fiberizing temperature was measured using a rotating cylinder method as described in ASTM C965-96(2007), entitled "Standard Practice for Measuring Viscosity of Glass Above the Softening Point," the contents of which are incorporated by reference herein. The liquidus temperature was measured by exposing glass to a temperature gradient in a platinum-alloy boat for 16 hours, as defined in ASTM C829-81(2005), entitled "Standard Practices for Measurement of Liquidus Temperature of Glass," the contents of which are incorporated by reference herein. Density was measured by the Archimedes method, as detailed in ASTM C693-93(2008), entitled "Standard Test Method for Density of Glass Buoyancy," the contents of which are incorporated by reference herein.

The specific modulus was calculated by dividing the measured elastic (or "Young's") modulus in units of GPa by the density in units of g/cm$^3$.

The tensile strength was measured on pristine fibers using an Instron tensile testing apparatus according to ASTM D2343-09 entitled, "Standard Test Method for Tensile Properties of Glass Fiber Strands, Yarns, and Rovings Used in Reinforced Plastics," the contents of which are incorporated by reference herein.

TABLE 1

| Component | Example 1 (% by wt.) | Example 2 (% by wt.) | Example 3 (% by wt.) | Example 4 (% by wt.) | Example 5 (% by wt.) |
|---|---|---|---|---|---|
| SiO$_2$ | 58.07 | 57.87 | 57.67 | 57.87 | 57.87 |
| Al$_2$O$_3$ | 20.00 | 20.20 | 20.40 | 20.20 | 20.20 |

TABLE 1-continued

| Component | Example 1 (% by wt.) | Example 2 (% by wt.) | Example 3 (% by wt.) | Example 4 (% by wt.) | Example 5 (% by wt.) |
|---|---|---|---|---|---|
| MgO | 11.3 | 11.3 | 11.3 | 11.6 | 11.1 |
| CaO | 8.5 | 8.5 | 8.5 | 8.2 | 8.7 |
| $Li_2O$ | 0.45 | 0.45 | 0.45 | 0.45 | 0.45 |
| $Fe_2O_3$ | 0.41 | 0.41 | 0.41 | 0.41 | 0.41 |
| $K_2O$ | 0.3 | 0.3 | 0.3 | 0.3 | 0.3 |
| $Na_2O$ | 0.23 | 0.23 | 0.23 | 0.23 | 0.23 |
| $TiO_2$ | 0.74 | 0.74 | 0.74 | 0.74 | 0.74 |
| R1: $(MgO + Al_2O_3)/(CaO + SiO_2)$ | 0.470 | 0.475 | 0.479 | 0.481 | 0.470 |
| R2: $(MgO + Al_2O_3 + Li_2O)/(CaO + SiO_2 + Na_2O + K_2O)$ | 0.473 | 0.478 | 0.482 | 0.484 | 0.473 |
| R3: $MgO/SiO_2$ | 0.195 | 0.159 | 0.196 | 0.200 | 0.191 |
| Property | | | | | |
| Fiberizing Temperature (° C.) | 1277 | 1278 | 1278 | 1275 | 1278 |
| Liquidus Temperature (° C.) | 1217 | 1223 | 1226 | 1224 | 1211 |
| ΔT (° C.) | 59 | 56 | 52 | 51 | 66 |
| Density ($g/cm^3$) | 2.6197 | 2.6203 | 2.623 | 2.6198 | 2.6221 |
| Elastic Modulus (GPa) | 91.0 | 91.1 | 91.2 | 91.0 | 91.1 |
| Specific Modulus (MJ/kg) | 34.7 | 34.8 | 34.8 | 34.7 | 34.7 |
| Tensile Strength (MPa) | 4804 | 4813 | 4821 | 4823 | 4806 |

TABLE 2

| Component | Example 6 (% by wt.) | Example 7 (% by wt.) | Example 8 (% by wt.) | Example 9 (% by wt.) | Example 10 (% by wt.) |
|---|---|---|---|---|---|
| $SiO_2$ | 58.75 | 58.26 | 58.01 | 58.51 | 58.16 |
| $Al_2O_3$ | 20.00 | 20.30 | 20.50 | 20.30 | 20.50 |
| MgO | 11.3 | 11.2 | 11.5 | 11.2 | 11 |
| CaO | 8.4 | 8.5 | 8.25 | 8.25 | 8.6 |
| $Li_2O$ | 0.4 | 0.5 | 0.5 | 0.5 | 0.5 |
| $Fe_2O_3$ | 0.3 | 0.39 | 0.39 | 0.39 | 0.39 |
| $K_2O$ | 0.15 | 0.1 | 0.1 | 0.1 | 0.1 |
| $Na_2O$ | 0.1 | 0.2 | 0.2 | 0.2 | 0.2 |
| $TiO_2$ | 0.6 | 0.55 | 0.55 | 0.55 | 0.55 |
| R1: $(MgO + Al_2O_3)/(CaO + SiO_2)$ | 0.47 | 0.472 | 0.483 | 0.472 | 0.472 |
| R2: $(MgO + Al_2O_3 + Li_2O)/(CaO + SiO_2 + Na_2O + K_2O)$ | 0.470 | 0.477 | 0.488 | 0.477 | 0.477 |
| R3: $MgO/SiO_2$ | 0.192 | 0.192 | 0.197 | 0.191 | 0.189 |
| Property | | | | | |
| Fiberizing Temperature (° C.) | 1286 | — | — | 1286 | 1283 |
| Liquidus Temperature (° C.) | 1222 | — | — | 1214 | 1226 |
| ΔT (° C.) | 64 | — | — | 71 | 58 |
| Density ($g/cm^3$) | 2.6118 | — | — | 2.6131 | 2.6159 |
| Elastic Modulus (GPa) | 91.8 | 91.4 | 91.9 | 91.4 | 91.3 |
| Specific Modulus (MJ/kg) | 34.5 | 34.9 | 35 | 34.9 | 34.9 |
| Tensile Strength (MPa) | 4857 | 4900 | 4888 | 4931 | 4922 |

Tables 1 and 2 illustrate the particular balance of a moderate elastic modulus (between 90 and 92 GPa) and good tensile strength, while maintaining fiberizing temperatures below 1,300° C. that is achieved by glass fibers formed in accordance with the present inventive concepts. Particularly, each of the glass compositions in Tables 1 and 2 demonstrate a ratio (R1) $(MgO+Al_2O_3)/(CaO+SiO_2)$ of at least 0.47, a ratio (R2) $(MgO+Al_2O_3+Li_2O)/(CaO+SiO_2+Na_2O+K_2O)$ above 0.46, and a ratio (R3) $(MgO/SiO_2)$ of at least 0.19.

In contrast, Table 3 below details comparative examples from European application number 10860973.6. As illustrated, the exemplary comparative compositions fail to meet each of R1, R2, and R3, which leads to fiberizing temperatures above 1,300° C. and elastic modulus values above 92 GPa. The inventive glass composition balances a moderate elastic modulus (between 90 and less than 92 GPa) and good tensile strength with a low fiberizing temperature.

TABLE 3

| Component | Comp. Ex. 1 (% by wt.) | Comp. Ex. 2 (% by wt.) | Comp. Ex. 3 (% by wt.) | Comp. Ex. 4 (% by wt.) |
|---|---|---|---|---|
| $SiO_2$ | 59.87 | 58.62 | 58.3 | 58.05 |
| $Al_2O_3$ | 21.53 | 21.2 | 21.08 | 20.99 |
| MgO | 9.08 | 10.14 | 10.14 | 7.83 |
| CaO | 7.8 | 8.74 | 8.74 | 10.92 |
| $Na_2O$ | 1.5 | 1.07 | 1.5 | 1.07 |
| $TiO_2$ | 0.03 | 0.03 | 0.03 | 0.83 |
| $Fe_2O_3$ | 0.16 | 0.18 | 0.18 | 0.31 |
| R1: $(MgO + Al_2O_3)/(CaO + SiO_2)$ | 0.452 | 0.463 | 0.465 | 0.417 |
| R2: $(MgO + Al_2O_3 + Li_2O)/(CaO + SiO_2 + Na_2O + K_2O)$ | 0.443 | 0.458 | 0.456 | 0.411 |
| R3: $MgO/SiO_2$ | 0.151 | 0.172 | 0.174 | 0.135 |
| Property | | | | |
| Fiberizing Temperature (° C.) | 1372 | 1333 | 1330 | 1341 |
| Liquidus Temperature (° C.) | 1260 | 1257 | 1265 | 1298 |
| $\Delta T$ (° C.) | 112 | 76 | 65 | 43 |
| Density (g/cm$^3$) | 2.57 | 2.6 | 2.59 | 2.6 |
| Elastic modulus (GPa) | 92.4 | 94.9 | 94.2 | 93.0 |
| Tensile Strength (MPa) | 4780 | 4773 | 4685 | — |
| Specific Modulus (MJ/kg) | 34.2 | 34.2 | 34.2 | 35.76 |

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A glass composition comprising:
$SiO_2$ in an amount from 57.0 to 62.0% by weight;
$Al_2O_3$ in an amount from 20.0 to 25.0% by weight;
CaO in an amount from 7.0 to 9.0% by weight;
MgO in an amount from 8.0 to 12.5% by weight;
$Na_2O$ in an amount from 0 to 1.0% by weight;
$K_2O$ in an amount from 0 to 0.5% by weight;
$Li_2O$ in an amount from 0.5 to 1.0% by weight; and
$TiO_2$ in an amount from 0.2 to 1.5% by weight, wherein a weight percent ratio (R1) $(MgO+Al_2O_3)/(SiO_2+CaO)$ is at least 0.47, a weight percent ratio (R3) $(MgO/SiO_2)$ is at least 0.19, and wherein the glass composition has a fiberizing temperature no greater than 1,300° C.

2. The glass composition according to claim 1, wherein the composition comprises 57.1% by weight to less than 59% by weight $SiO_2$.

3. The glass composition according to claim 1, wherein the composition comprises 7.9% by weight to less than 9.0% by weight CaO.

4. The glass composition according to claim 1, wherein the combined amounts of $SiO_2$, $Al_2O_3$, MgO, and CaO is at least 98% by weight and less than 99.3% by weight.

5. The glass composition according to claim 1, wherein the glass composition is free of rare earth oxides.

6. The glass composition according to claim 1, wherein the glass composition comprises greater than 20% to 21% by weight $Al_2O_3$.

7. The glass composition according to claim 1, wherein the glass composition includes 0.5% to 0.8 wt. % $Li_2O$.

8. The glass composition according to claim 1, wherein the glass composition is essentially free of $B_2O_3$.

9. The glass composition according to claim 1, wherein the glass composition includes 0.1 to 0.8% by weight Na2O.

10. The glass composition according to claim 1, wherein the glass composition includes a weight percent ratio (R2) $(MgO+Al_2O_3+Li_2O)/(CaO+SiO_2+Na_2O+K_2O)$ that is greater than 0.46.

11. A method of forming a continuous glass fiber comprising:
providing a molten glass composition according to claim 1; and
drawing the molten glass composition through an orifice to form a continuous glass fiber.

12. A glass composition comprising:
$SiO_2$ in an amount from greater than 57.0 to 62.0% by weight;
$Al_2O_3$ in an amount from 20.0 to 25.0% by weight;
CaO in an amount from 7.0 to 11.5% by weight;
MgO in an amount from 8.0 to 12.5% by weight;
Na2O in an amount from 0 to 1.0% by weight;
$K_2O$ in an amount from 0 to 0.5% by weight;
$Li_2O$ in an amount from 0.5 to 0.8% by weight; and
$TiO_2$ in an amount from 0.2 to 1.5% by weight, wherein a weight percent ratio (R2) $(MgO+Al_2O_3+Li_2O)/(CaO+SiO_2+Na_2O+K_2O)$ that is greater than 0.46, a weight percent ratio (R3) $(MgO/SiO_2)$ is at least 0.19, and wherein the glass composition has a fiberizing temperature no greater than 1,300° C.

13. The glass composition according to claim 12, wherein the glass composition comprises 57.1% by weight to less than 59% by weight $SiO_2$.

14. The glass composition according to claim 12, wherein the glass composition comprises 7.9% by weight to less than 9.0% by weight CaO.

15. The glass composition according to claim 12, wherein the combined amounts of $SiO_2$, $Al_2O_3$, MgO, and CaO is at least 98% by weight and less than 99.3% by weight.

16. The glass composition according to claim 12, wherein the glass composition is free of rare earth oxides.

17. The glass composition according to claim 12, wherein the glass composition comprises greater than 20% to 21% by weight $Al_2O_3$.

18. The glass composition according to claim 12, wherein the glass composition includes 0.5% to 0.8 wt. % $Li_2O$.

19. The glass composition according to claim 12, wherein the glass composition includes 0.1 to 0.8% by weight $Na_2O$.

20. The glass composition according to claim 12, wherein the glass composition includes a weight percent ratio (R1) $(MgO+Al_2O_3)/(SiO_2+CaO)$ is at least 0.47.

21. A glass fiber formed from a glass composition comprising:

$SiO_2$ in an amount from 57.0 to 62.0% by weight;

$Al_2O_3$ in an amount from 20.0 to 25.0% by weight;

CaO in an amount from 7.0 to 9.0% by weight;

MgO in an amount from 8.0 to 12.5% by weight;

$Na_2O$ in an amount from 0 to 1.0% by weight;

$K_2O$ in an amount from 0 to 0.5% by weight;

$Li_2O$ in an amount from 0.5 to 1.0% by weight; and $TiO_2$ in an amount from 0.2 to 1.5% by weight, wherein a weight percent ratio (R1) $(MgO+Al_2O_3)/(SiO_2+CaO)$ is at least 0.47, a weight percent ratio (R3) $(MgO/SiO_2)$ is at least 0.19, and wherein the glass composition has a fiberizing temperature no greater than 1,300° C., and wherein said glass fiber has an elastic modulus of between 90 GPa and 92 GPa.

22. A glass fiber according to claim 21, wherein the glass fiber has a density that is at least 2.6 g/cm³.

23. A glass fiber according to claim 21, wherein the glass composition comprises 57.1% by weight to less than 59% by weight $SiO_2$.

24. A glass fiber according to claim 21, wherein the glass composition comprises 7.9% by weight to less than 9.0% by weight CaO.

25. A glass fiber according to claim 21, wherein the combined amounts of $SiO_2$, $Al_2O_3$, MgO, and CaO is at least 98% by weight and less than 99.3% by weight.

26. A reinforced composite product comprising;

a polymer matrix; and a plurality of glass fibers formed from a glass composition comprising:

$SiO_2$ in an amount from 57.0 to 62.0% by weight;

$Al_2O_3$ in an amount from 20.0 to 25.0% by weight;

CaO in an amount from 7.0 to 9.0% by weight;

MgO in an amount from 8.0 to 12.5% by weight;

$Na_2O$ in an amount from 0 to 1.0% by weight;

K20 in an amount from 0 to 0.5% by weight;

$Li_2O$ in an amount from 0.5 to 1.0% by weight; and $TiO_2$ in an amount from 0.2 to 1.5% by weight, wherein a weight percent ratio (R1) $(MgO+Al_2O_3)/(SiO_2+CaO)$ is at least 0.47, a weight percent ratio (R3) $(MgO/SiO_2)$ is at least 0.19, and wherein the glass composition has a fiberizing temperature no greater than 1,300° C., and wherein said glass fiber has an elastic modulus of between 90 GPa and 92 GPa.

27. A reinforced composite product according to claim 26, wherein the reinforced composite product is in the form of a wind blade.

*    *    *    *    *